Aug. 28, 1962 J. H. LEMELSON 3,051,777
MAGNETIC RECORDING SYSTEMS
Filed June 27, 1957 8 Sheets-Sheet 1

INVENTOR.
Jerome H. Lemelson
BY

INVENTOR.
Jerome H. Lemelson

INVENTOR.
JEROME H. LEMELSON
BY

INVENTOR.
JEROME H. LEMELSON
BY

INVENTOR.
Jerome H. Lemelson

INVENTOR.
Jerome H. Lemelson

INVENTOR.
JEROME H. LEMELSON
BY

INVENTOR.
JEROME H. LEMELSON
BY

United States Patent Office 3,051,777

Patented Aug. 28, 1962

3,051,777
MAGNETIC RECORDING SYSTEMS

Jerome H. Lemelson, 43A Garfield Apts., Metuchen, N.J.

Filed June 27, 1957, Ser. No. 663,348
23 Claims. (Cl. 178—6.6)

Figure 1:
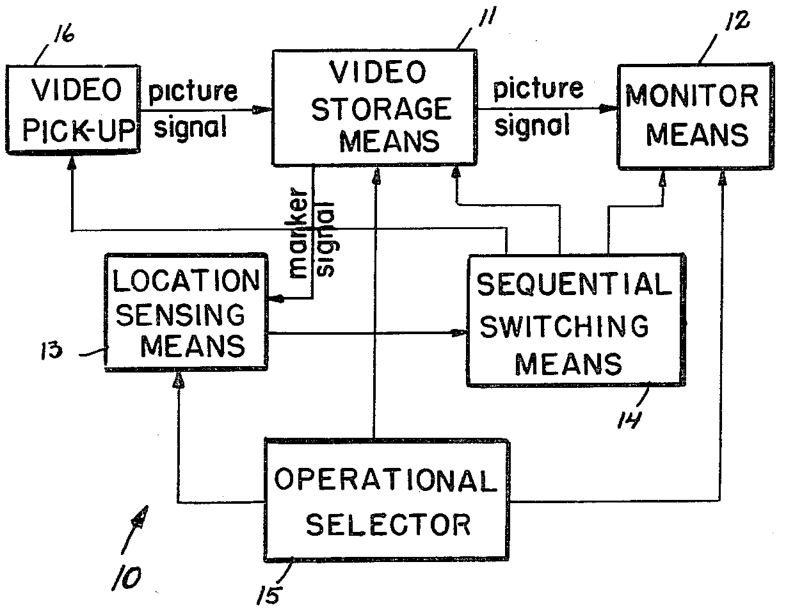

This invention relates to video storage systems and more particularly to a video storage system adapted for single frame recording in a selected location of the storage means and the playback of a single frame recorded at a selected location of the storage means. This application is a continuation in part of my copending application Serial Number 515,417 filed June 14, 1955, for Computing Apparatus and application Serial Number 544,991 filed November 4, 1955, for Magnetic Recording.

Heretofore video recording and reproduction has been limited in scope to the transducing on or from magnetic tape of a succession of frames in the form of a continuously generated video information signal produced by a video scanning camera during an extended period of time in which said camera is driven by a free running sync signal generator or is locked into and driven by power line alternating current. While this sufficiently serves the desired end of providing an elongated signal which is a motion picture recording of events as they occur, other realms of recording such as the fields of business record storage and animated cartooning, and the temporary storage of a picture record in the form of discrete signals of different still image fields or frames cannot be accomplished by the conventional video tape recording and reproduction apparatus.

Provided hereafter are means for magnetically recording and visually reproducing thereafter picture information, such as a single page of a business record, in the form of a single video beam trace signal of said page, or double trace in the case of interlaced scanning. This single frame signal, transmitted from a video camera, is recorded on a moving magnetic tape in a predetermined location thereon. Other page information signals are recorded in tandem on the tape. At a later time, when this page is to be referred to, a selector means such as a pushbutton, dial selector or other controller is set to a code position corresponding to the tape position on which the desired information is recorded and reproduction of said page as an image on a video screen is effected by subsequent operations of the system occurring in a predetermined sequence. Initially, the tape drive is started and marker signals are read by a pickup head. Said marker signals may be recorded at intervals along the tape and provided thereon prior to subsequent video signal recording or the frame sync signal of the prior recorded frame may be recorded adjacent said frame signal and act as a marker signal. The reproduction transducer or pick-up head for said marker signals transmits pulses to a location sensing means such as a presettable counter which has previously been set by the selector means. In a system not employing a closed loop tape transport, when the tape reaches the desired frame one of two control functions will occur depending on the direction in which the tape is being driven.

If the tape is being driven in the same direction as it was driven during recording, the location sensing means transmits a signal which is multiplied in number to a plurailty of signals each of which is sent thru delay lines which impart varying degrees of delay such that the playback or reproduction head for said recorded video signal reads only during the interval that the selected frame is opposite the playback head. If the tape is travelling in a direction opposite to the direction of travel during recording, the plurality of delayed signals will first stop the drive-motor driving said tape after the tape has been driven to a point beyond the selected frame. The drivemotor will then reverse and during the interval the selected frame is opposite the playback head, this head will be activated to record a video signal on the tape.

The selected information may be viewed on a visual display device of a monitoring means which may include a storage drum revolving at constant speed and having erasing, playback and recording heads associated therewith.

The erase head is first activated to clear old signals from the drum. Then video signals are transmitted from the playback head associated with the tape to the drum recording head which records the single frame on the revolving drum. The signals recorded on the drum are received by the drum playback head and conveyed to the visual display device which may be similar to the conventional home TV receiver. A C.R.T. of moderately low persistency may be used since the C.R.T. will be fed each time the drum makes a complete revolution.

The recording operation is similar to the playback operation in that the locating means or predetermining counter is first set by the dials or pushbuttons so that recording will take place on a selected section of tape. If the tape is driven in the improper direction for recording it will be driven past the preselected location, stopped, and reversed. Then the erasing head will be activated to erase signals from the selected tape frame. Next, a first recording head and the video camera will be activated and in a system that records its own marker signals, so will a second recording head. The first recording head records the single frame video signal while the second recording head records the sync signal at the end of the frame to serve as a marker for the succeeding frame. Next, the pick up head is activated so that the newly recorded video may be fed to the visual display means for monitoring.

Sequential switching of the video heads, tape drives, and camera circuits is preferably accomplished by means of a sync signal originating from the presettable or location sensing means counter. The sync signal is transmitted to a sequential switching means which splits or multiplies the sync signal into a plurality of signals that are each given a predetermined degree of delay in accordance with the setting of the operational selector. The delayed signals are then used to condition bistable switches which in turn activate and deactivate the video heads, tape drives, and camera circuits in the proper sequence to achieve the selected mode of operation.

The video storage system just described will greatly simplifiy the production of animated cartoon in that a succession of frames may be recorded on the tape in tandem to produce the complete cartoon and as each frame is recorded it will be monitored with any changes in that frame being made before subsequent frames are recorded. The monitored frame indicates how much the positions of the cartoon characters are to be altered. The recently recorded frame is erased and the newly positioned characters are recorded on that frame.

Conventional cartoon film may be used in conjunction with the tape system by providing an opical system that will present identical images to a film camera and the video camera feeding the magnetic tape. First the image is recorded on the tape and monitored. When the positions of the characters have been altered to produce the desired image as viewed on the visual indicating device, the shutter of the film camera is activated to record the image on film.

Accordingly, a primary object of my invention is to provide a video storage system wherein business records may be stored.

Another object is to provide a video storage system for the production of animated cartoons.

Still another object is to provide a video storage system including means whereby a single frame video signal may be recorded on a predetermined location of the storage means.

A further object is to provide a video storage system including means whereby a single frame of information recorded on a selected location of the storage means may be viewed.

A still further object is to provide a video storage system including a sequential switching means whereby recording on and playback from selected storage means locations may be affected.

Yet another object is to provide a video storage system including a location sensing means whereby selected areas of the storage means may be located.

Figure 3:
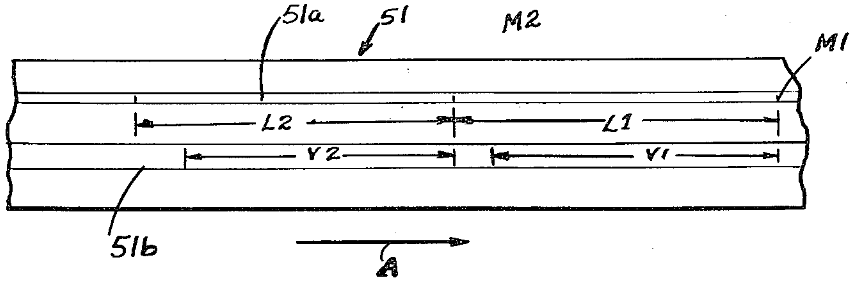
Figure 2:
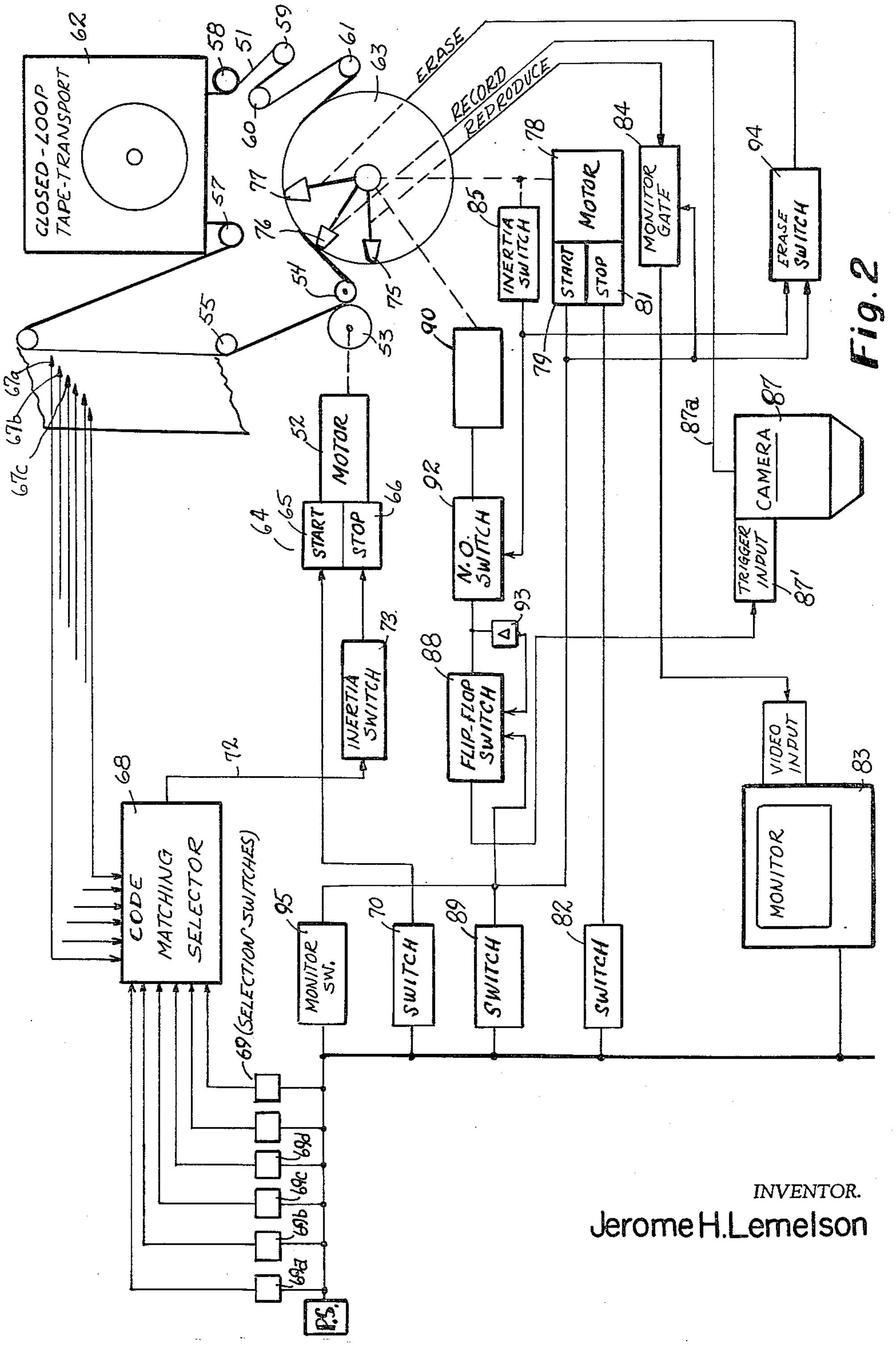
Figure 4:
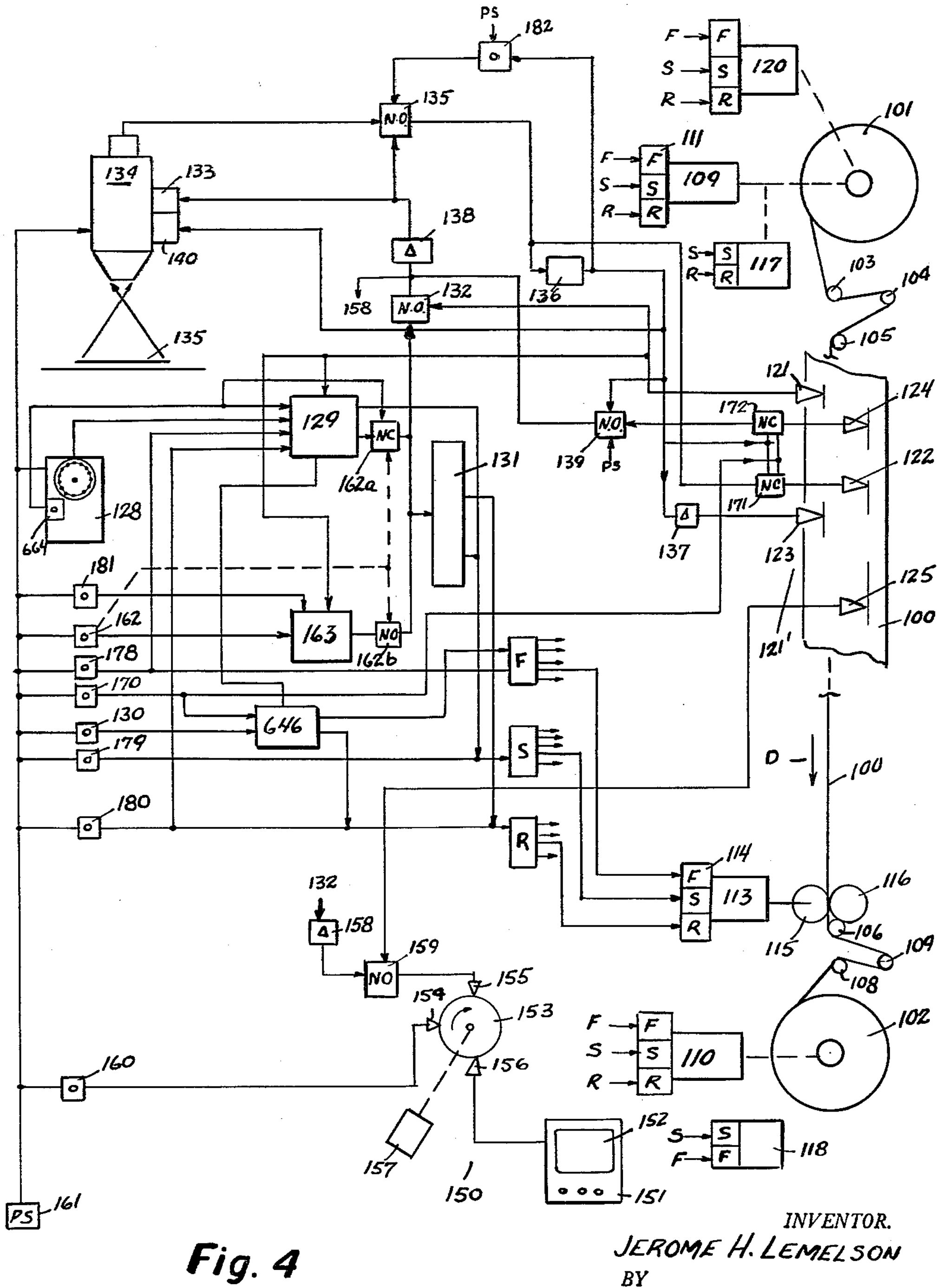
Figure 4:
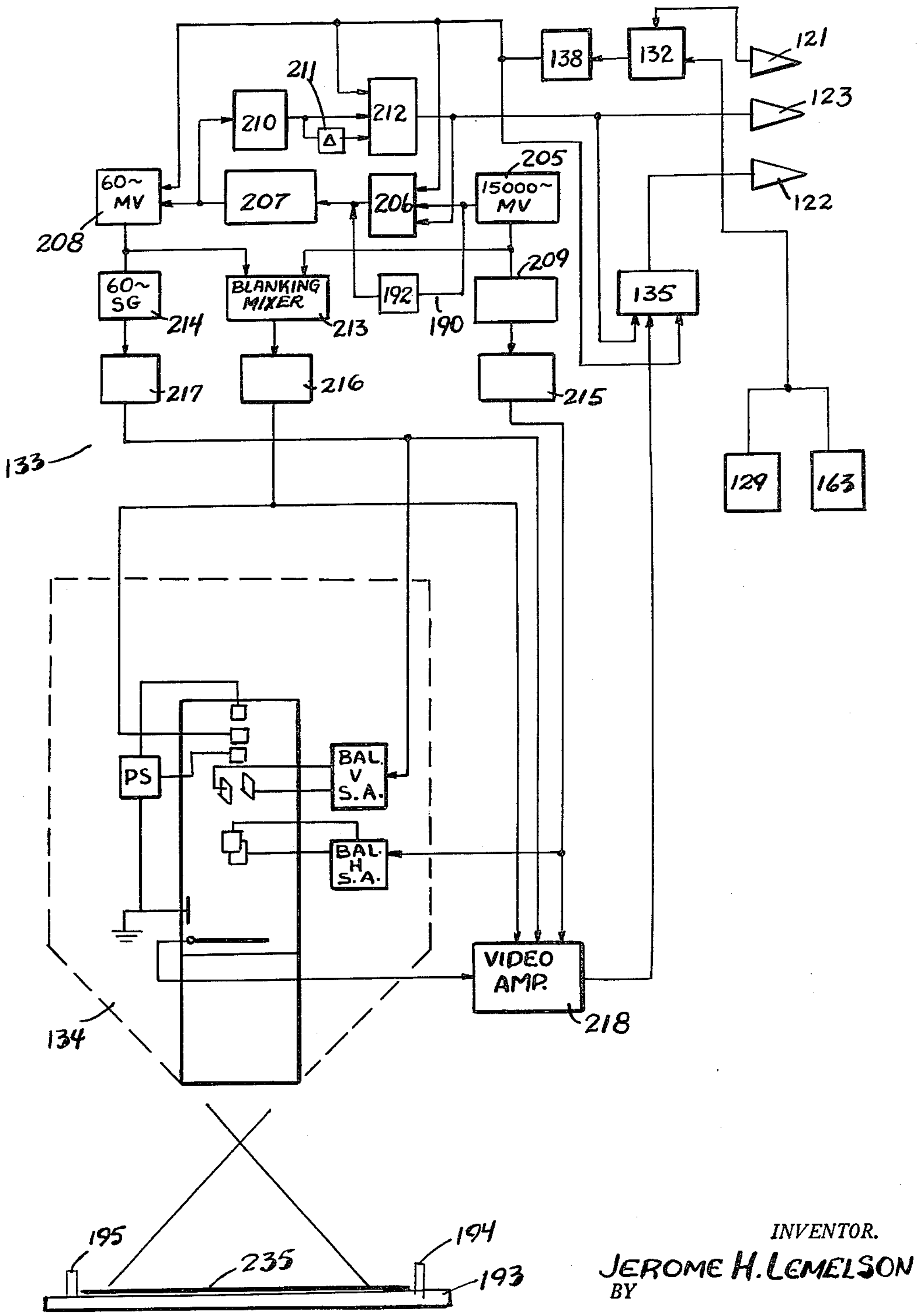
Figure 4A:
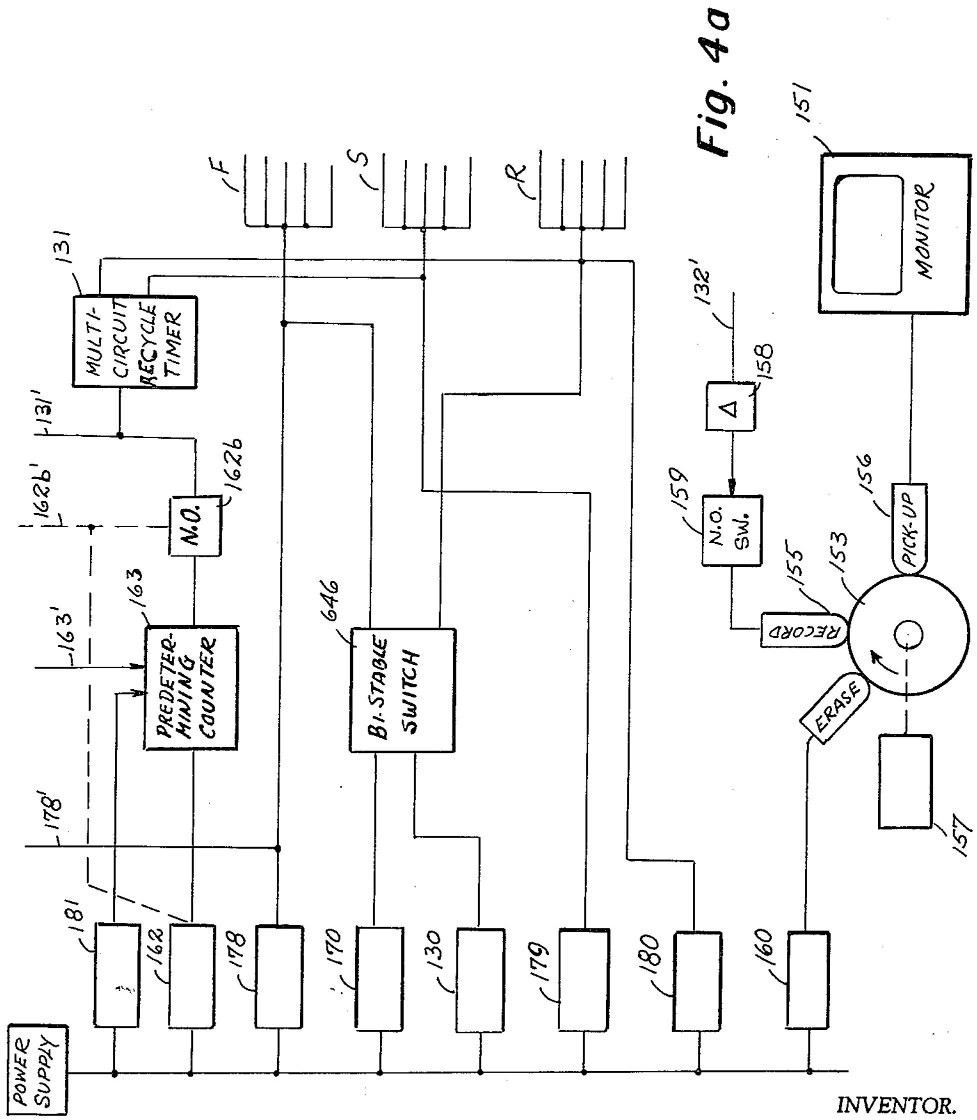
Figure 4B:
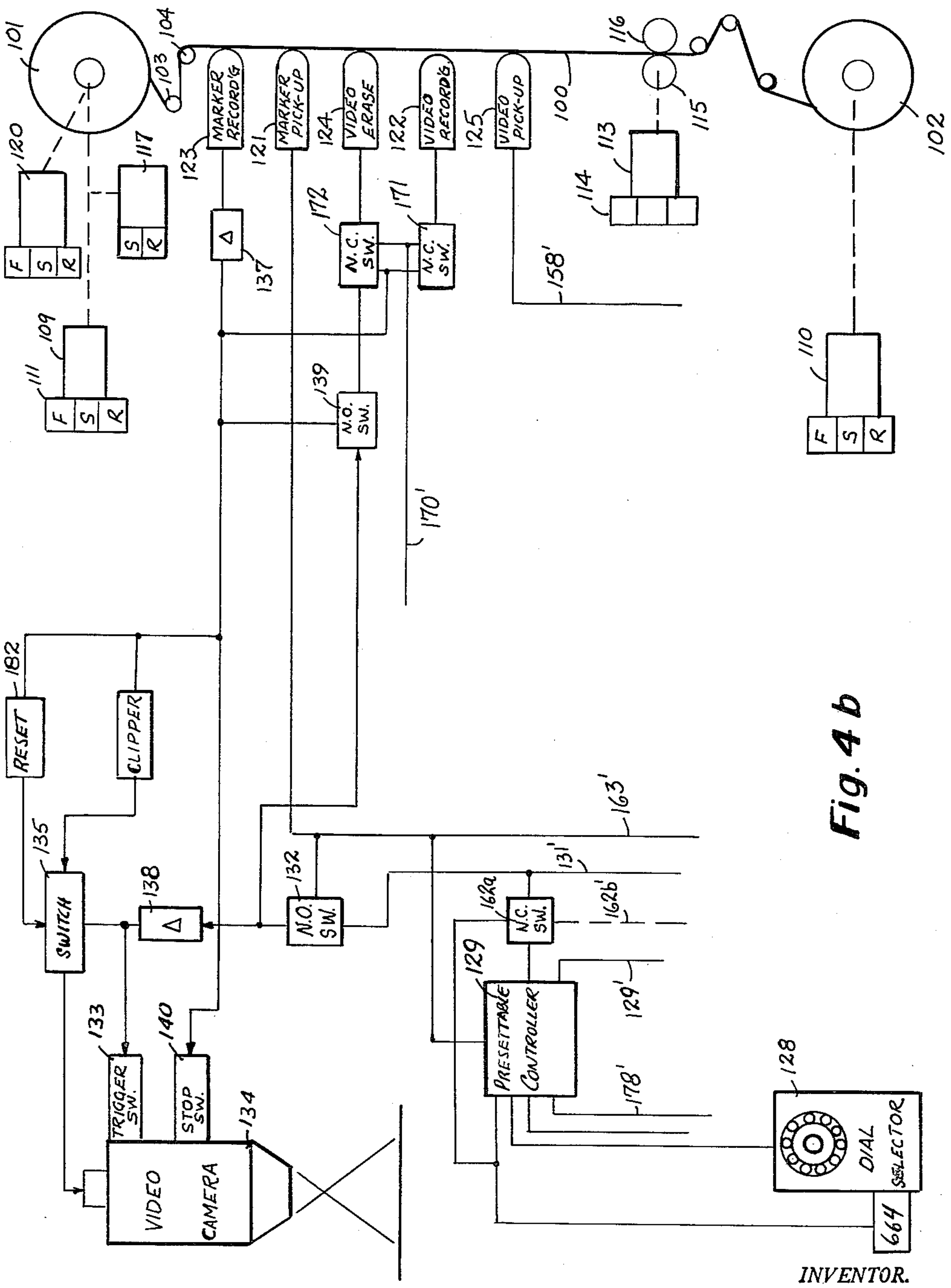
Figure 5:
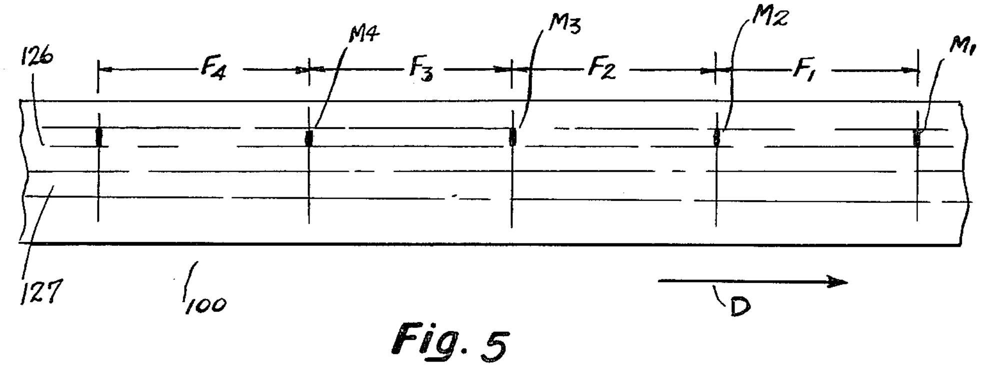
Figure 6:
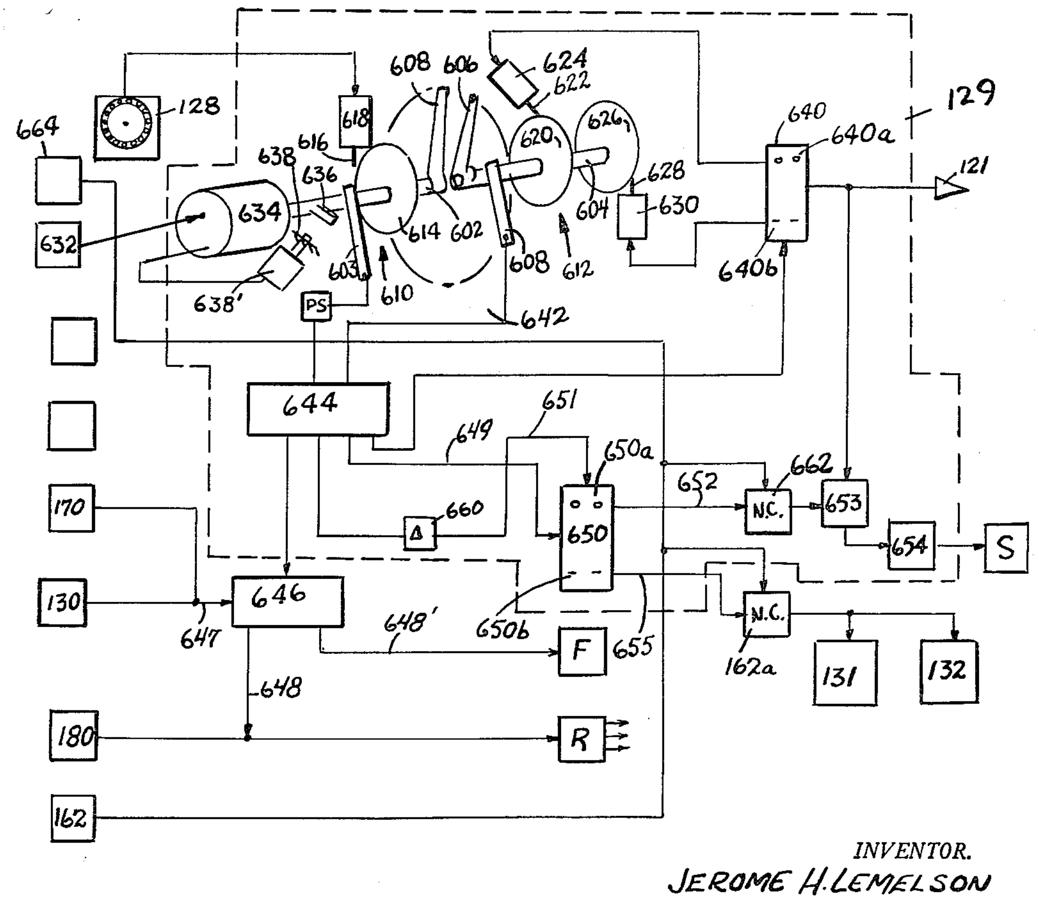
Figure 7:
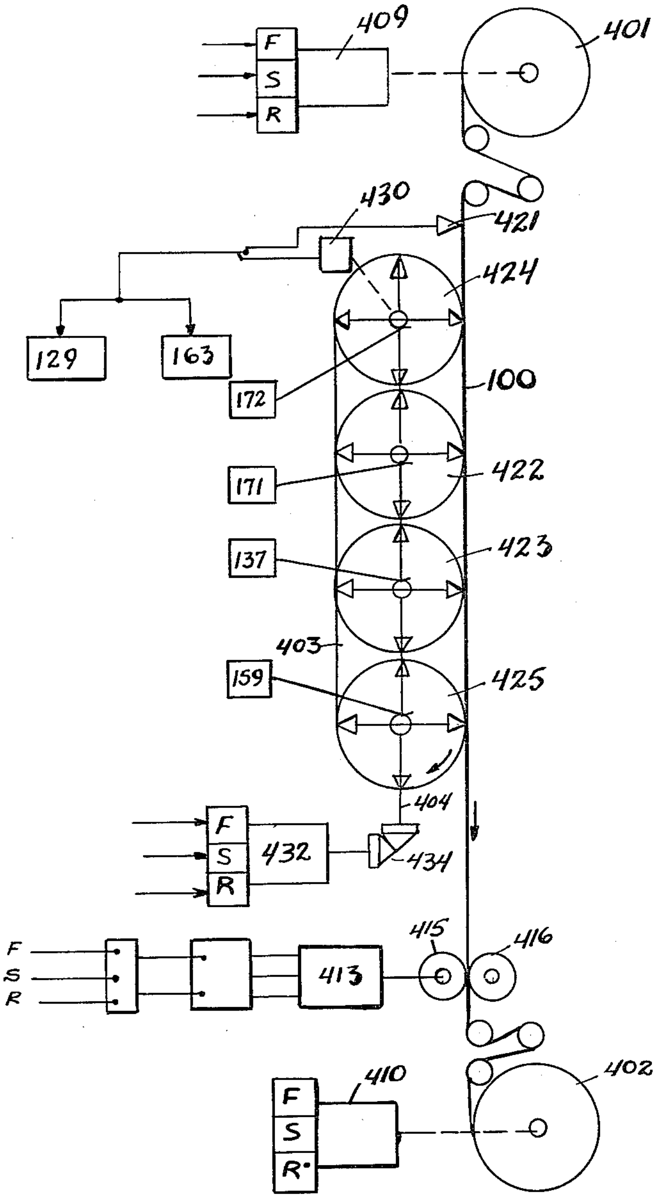

These and other objects of my invention will become more apparent after reading the following description of the accompanying drawings in which: FIG. 1 is a block diagram of a video storage system for the recording and playback of single frame video signals. FIG. 2 is a schematic of a first embodiment of this invention utilizing a closed loop tape transport and in which recording and playback is accomplished by stopping the tape and moving the video heads. FIG. 3 is a section of the recording medium used in the embodiment of FIG. 2. FIG. 4 is a schematic of another embodiment of this invention wherein recording on and playback from the magnetic tape occurs while the tape is in motion. FIGS. 4*a* and 4*b* combined are FIG. 4 enlarged with legends applied to the boxes. FIG. 5 is a section of the recording medium used in the embodiment of FIG. 4. FIG. 6 is a schematic of the pulse counting device used as the location sensing means of FIG. 4. FIG. 7 is a schematic diagram of another embodiment employing movement of both the magnetic tape and magnetic transducing heads for recording thereon and playback therefrom at lower tape speeds. FIG. 4′ is a schematic diagram showing means for deriving a single video frame signal by triggering the read beam of a video scanning camera.

Referring to the block diagram of FIG. 1, my video storage system 10 comprises an operational selector 15 for selecting the mode of operation of the system 10. Signals from operational selector 15 are fed to video storage means 11, monitor means 12 and location sensing means 13 to initiate system operation. Marker signals are transmitted from video storage means 11 to location sensing means 13 which generates a sync signal at the instant the marker signals correspond to a preset condition of the presettable locating means 13. The sync signal is fed to the sequential switching means 14 whose multi outputs of varying delays are fed to video pickup 16, video storage means 11, and monitor means 12 to control their sequence of operation.

Referring to FIGS. 2 and 3, numeral 50 refers generally to a closed loop transport system for the positioning of video storage medium or magnetic recording tape 51 which is driven in the direction indicated by arrow A. Tape 51 is driven by motor 52 through frictional engagement with capstan 53 and depressor roller 54 over a closed path defined by idlers 54—61, transport 62 and drum 63 constructed of non-magnetic material. Since the tape 51 travels through a closed loop the motor controller 64 need only have a forward 65 and stop 66 control.

As seen in FIG. 3 the tape 51 is arranged to have one or more longitudinal marker channels **51*a* and one or more video channels 51*b* parallel to the marker channels. Video signals V–1, V–2, etc., are recorded on tape lengths L–1, L–2 respectively which are arranged in tandem on tape 51. It is to be noted that video signals V–1, V–2 do not run the full lengths of L–1, L–2 respectively for a reason to be hereinafter fully explained. Associated with each length L–1, L–2 are markers M–1, M–2 respectively recorded on the one or more marker channels 51*a* which will identify a particular length L–1, L–2**.

The markers or code signals recorded on marker channels **51*a* are read by marker pickup heads 67*a*, 67*b*, 67*c*, etc., which are positioned in the vicinity of idler 56. The signals received by marker pickup heads 67 are transmitted to a location sensing means which is a presettable code matching device 68 which has been conditioned by selectors 69*a*, 69*b*, 69*c*, etc. Presettable code matching device 68 may be of the digital type described in detail in my copending application 626,211, filed Dec. 4, 1956, or code matching device 68** may comprise a device of the pulse counting variety.

Selectors 69 are set so that the tape length L having the desired video V recorded thereon, or on which length L new information V is to be recorded, will be positioned between depressor roll 54 and idler 61 with marker M being close to idler 61 when motor 52 is stopped. The operation which achieves this proceeds as follows:

(1) Tape transport motor 52 is started by transport switch 70 which sends a signal through line 71 to the forward control 65 of motor controller 64.

(2) As the tape 51 moves along, marker pickup heads 67 read markers M and transmit the code to presettable code matching device 68 until such time as the code signal of marker M coincides with the code setting of selector 69.

(3) At that instant the presettable code matching device 68 transmits a signal through line 72 to stop control 66 and the power for transport motor 52 is thereby turned off.

(4) But the tape 51, because of its inertia and the inertia of closed loop transport 50, will continue to move until the inertia energy is spent, at which time the desired length L will be positioned between depressor roll 54 and idler 61 to follow the curvature of drum 63.

It may be desirable to insert a normally open switch 73 in line 72 so that the signal transmitted from the presettable code matching device 68 will not reach stop control 66 unless motor 52 is up to speed thereby assuring a uniform coasting distance for tape 51. Switch 73 may be an inertia switch riding on the rotor of motor 52.

Drum 63 is freely mounted on shaft 74, having keyed thereto video pickup head 75, video recording head 76, and erasing head 76 together with an associated slip ring (not shown) for each head with heads 75—77 being positioned within drum 63 and close to the surface thereof. Brushes (not shown) are in contact with the slip rings to convey signals to and from heads 75—77. Head motor 78, when energized through the forward control 79 of 80, will cause shaft 74 to rotate clockwise with respect to FIG. 2, or in the direction of arrow B, until such time as stop control 81 is manually actuated by stop switch 82 or automatically actuated by video camera 87 in a manner to be hereinafter fully explained.

Pickup head 75 reads video signals V on length L positioned over drum 63 and transmits reproductions of these signals V to monitor means 83 through normally open monitor gate 84 which is closed by a signal from inertia switch 85 when head motor 78 is up to speed. Monitor means 83 may include a storage tube whose face, after being scanned once, will retain the image thereon for as long as ten minutes or until such time as the erase switch 86 is actuated. Many well-known storage tubes such as those described in the text, "Storage Tubes" by Knoll and Kazan, may be used.

Video picture signal recording head 76 is energized by the picture signal output of video camera 87 which may be of the type used for conventional television transmission wherein the image field I is scanned twice for each frame to produce an interlace pattern, or the video camera 87 may be of a type that scans the image field I but one each frame. The video signals from camera 87 are also fed through a clipper and delay means 96, such as a pentode clipper adapted to pass only the frame vertical sync signal at the trailing edge of the frame composite video picture signal to actuate stop control 81.

Video camera 87 is controlled by a camera actuator 88 which is conditioned by signals originating from recording switch 89 and shaft position switch 90. Camera actuator 88 is a bistable switch of the type that will pass an input signal to one of two output circuits depending on the condition dictated by the last switching input and will continue to pass signals to this circuit until such time as a new condition is set up by other switching signals.

In the instant application camera actuator 88 includes a first output circuit thereof feeding a signal through line 91 to trigger input 87′ of video camera 87 while a second output circuit thereof is open. Signals will pass through the first output circuit after recording switch 89 has been energized or actuated while the second output will be active after the camera actuator switch 88 has been conditioned by a signal from shaft position switch 90.

Shaft position switch 90 may be a micro-switch actuated by a pin or cam (not shown) projection on shaft 74 once for each revolution of said shaft to indicate that the video recording head has just passed a predetermined point in its rotation and is opposite a predetermined point in the length of the tape between said guide rolls 54 and 61. When switch 90 is thus actuated, the signal output thereof produced when said switch completes a circuit with a power supply (not shown) may be used to effect recording of the desired video frame signal on said predetermined length of tape 51 as follows. It is assumed that the normally open switch 92 has been closed by the inertial switch or mechanism 85 operating off the shaft of motor 78 when said motor is operating at a speed to rotate the recording transducers secured to drum 63 at the desired recording velocity. When this occurs, the output of 90 will be passed through switch 92 to two circuits, one directly to a first signal input of camera actuator switch 88 and the other which includes a delay line 93, thru which said signal passes, to a second switching input of 88, which switches 88 after said other signal has passed therethru to circuit 91 so that successive signals from 90 will not be passed to 91. The signal passed thru 88 is transmitted to the trigger input 87′ of camera scanner 87 and is used to initiate the scanning sweep of the video tube in the camera. The resulting video picture signal output, which may be a composite video picture and blanking plus sync signals combined therewith is passed over cable 187*a* to the recording head 176 and to the clipper circuit 96. Signals will pass through the first output circuit after recording switch 89 has been activated while the second output will be active after camera actuator switch 88 has been conditioned by a signal from shaft position switch 90.

Shaft position switch 90 may be a micro switch actuated by a protrusion (not shown) of shaft 74 once for each revolution of the shaft 74, to indicate that the video recording head has just passed depressor roll 54. Signals from shaft position switch 90 must pass through normally open switch 92 which is closed by inertia switch 85 after drum motor 78 is up to speed. After passing through switch 92 the signal from switch 90 first acts as the input signal to camera actuator switch 88. Passing through delay element 93, it acts as the switching signal to open camera actuator switch 88 so that there will be no output from camera 87 after one frame is complete.

When recording switch 89 is actuated switch 88 will be conditioned to pass and input signal to video trigger input 87′. The next input signal to switch 88 will be the signal from shaft position switch 90 occurring after head motor 78 has reached operating speed since until this time switch 92 has been open. This signal is transmitted to video trigger input 87 which scans image field I in less time than it takes video recording head 76 to travel tape length L. Before a second signal has passed through switch 92, the first signals has passed through delay element 93 to open actuator switch 88. Viewing of the information recorded on a given tape length L may take place without simultaneously recording, by actuating monitor switch 95 which starts head motor 79 without conditioning camera actuator switch 88. It should now be apparent that the video signals V does not take up a full tape length L since the stopping of the tape by coasting is not the most precise positioning method. Furthermore, flyback time is required between video frames if they are to be played back in succession as a movie.

Erase head 77 is controlled by erase switch 94 which is only closed during the interval between the actuation of recording switch 89 and the time that head motor reaches speed as evidenced by a signal from inertia switch 85. Since inertia switch 85 also controls video recording, video camera 87 cannot be activated until erase head 77 has been deactivated.

Pickup head 75 is positioned counterclockwise of recording head 76 so that video signals V are monitored substantially at the instant they are recorded, thereby overcoming a most objectionable feature of photographic recording. That is, in film storage devices there is a long delay between the time that the information is recorded on the storage medium and the time that the information can be monitored. In addition, if an error has been made in the photograph or the information becomes obsolete this section of film cannot be reused whereas the video recording on magnetic tape permits faulty recordings to be instantly erased without destroying the storage medium.

It is to be understood that for the sake of clarity amplifiers associated with the various heads 75—77 have been omitted. For the same reason, the illustration of power supplies has been omitted from the drawings and it is assumed that sufficient power means are provided on the correct side of all switches and controls.

Referring more particularly to FIGS. 4 and 5, a second embodiment of my invention is illustrated wherein the magnetic storage medium is in motion during the recording and playback operation. Magnetic recording medium or tape 100 is fed between take up reels 101 and 102 and is guided therebetween by idlers 103—108. Reversible motors 109 and 110 drive reels 101 and 102 respectively and are controlled by motor controllers 111 and 112 respectively which have three positions, forward, stop, and reverse. With the controllers 111, 112 in the forward position tape 100 will move in the direction indicated by arrow D while in the reverse position tape 100 will move in the opposite direction. Brakes 117, 118 provide dynamic braking for reels 101, 102 respectively.

The actual driving of tape 100 is accomplished by constant speed drive motor 113 having motor controller 114 associated therewith. Capstan 115 connected to the output of drivemotor 113 is in frictional engagement with one side of tape 100 while depressor wheel 116 on the opposite side of tape 100 provides a support for capstan 115. Constant power supply brake 120 senses the tension in tape 100 and maintains same reasonably constant by regulating the speed of reel 101.

The tape drive system just described is typical of the art and is more particularly described in the R.C.A. Review, vol. XVII, September 1956, No. 3, pages 365–373.

Frame indicating or marker pickup head 121 is longitudinally aligned along tape 100 adjacent to marker channel 126 of tape 100 arranged in tandem with frame indicating marker recording head 123. In a line parallel to heads 121, 123 are video recording 122, erase 124, and reproduction 125 heads arranged adjacent to video channel 127.

Recording of a signal proceeds as follows when the tape 100 is being driven in the forward direction, which is the direction indicated by arrow D, and the tape frame F on which the recording is to take place is behind the tape frame opposite marker pickup head 121; that is, if marker pickup head 121 is at frame $F_3$ recording will take place on a higher membered frame sufficiently far behind to permit the tape 100 to attain operating speed.

Dial selector, 128, is placed at a setting corresponding to the frame F on which recording is to take place to set up presettable code matching device or pulse counting device 129, the detailed construction of which shall shall be hereinafter fully explained. Switch 130 is actuated to start rotation of tape drive motors 109, 110, 113 in the forward direction to drive tape 100 in direction F. Marker pickup head 121 reads marker pulses M and transmits each pulse to pulse counting device 129 which goes through an uncounting process until such time as a predetermined number of marker signals M pass marker pickup head 121. At this time, pulse counting device 129 will feed a zero pulse to close switch 132 which is a normally open switch having instantaneous closing and time delayed opening characteristics with the time delay interval being slightly less than the time it takes one tape frame F to pass a given point. However, switch 132 will remain open for a sufficient interval of time to allow the pulse from marker pickup head 121, following the pulse that uncounted pulse counting device 129 to zero, to pass through delay device 138 to the start control 133 of video camera 134 to thereby cause the read beam thereof to scan image field 135. The signal passing through switch 132 will also pass undelayed to close normally opened switch 139 which controls erase head 124, which is positioned opposite marker pickup head 121. Switch 139 remains closed for the time it takes a tape frame length F to pass a given point when the tape is moving at operating speed. Delay device 138 compensates for the longitudinal distance between erase head 124 and video recording head 122.

The pulse passing to camera start control 133 also conditions switch 135 to pass video signals from video camera 134 to clipper differentiator 136 and video recording head 122 which records the video signal on video channel 127 of tape 100. Bistable switch 135 alternately opens and closes as switching pulses are received from marker pickup head 121 and clipper differentiator 136. Clipper differentiator 136 clips the lower amplitude video signals and transforms the frame vertical sync signal at the end of a video frame to a pulse which is used to close switch 135 and, in a system that records its own marker pulses on tape 100, also passes to marker recording head 123 through delay line 137 which delays the pulse for a length of time equal to the time interval between frames in conventional television transmission and the length of time it takes a point on the tape to travel the longitudinal distance between heads 122 and 123. The signal from clipper differentiator 136 also passes to stop switch 140 of video camera 134 and is effective to position the read beam thereof, to begin the next scanning of the image field 135.

The zero pulse fed by the pulse counting device 129 to normally open switch 132 is also fed to multi circuit cycle time 131 which comprises a plurality of time delay elements (not shown) so arranged that after recording is effected on the selected frame, the tape drive motors 109, 110 are stopped and then reversed. The tape drive motors are stopped thereafter such that the tape is at a point a predetermined number of frames in advance of the frame on which recording has just taken place so that the tape will be able to accelerate to recording speed in the distance to the frame following the frame on which recording has just taken place. The final stopping operation is controlled by stop counter 654 operating in a manner to be hereinafter described.

Monitor means 150 comprises a viewing device 151, which may be a conventional type video receiver, and a rotating magnetic recording drum 153, having associated therewith, monitor erase head 154, monitor recording head 155, and monitor pickup head 156. The circumference of drum 153 is equal to or slightly larger than the distance required to record a single frame of video thereon at said video recording speed and the drum 153, is driven at a constant speed by synchronous motor 157 so that picture tube 152 may be of low persistence and with each revolution of drum 153 the write beam of picture tube 152 will be modulated thereby and renew the single frame presentation.

Video pickup head 125 transmits video signals reproduced from tape 100 to monitor recording head 155 through normally open switch 159. The marker pulse passing switch 132 after passing through time delay element 158 closes switch 159. Switch 159, once closed, remains in this condition for the interval of time required for a tape frame length F to pass a fixed point. Delay element 158 provides a time delay interval to compensate for the longitudinal distance between marker pickup head 121 and video pickup head 125, so that part of the prior signal on 100 will not be passed to 155. Video signals recorded on rotating drum 153 are read by monitor pickup head 156 and transmitted to viewing device 151 where an essentially instantaneous monitoring process takes place.

Push button switch 160, when closed, energizes monitor erase head 154 and is preferably actuated before start switch 130 which originates system operation.

When tape 100 is stopped a predetermined number of frames in advance of the frame F on which recording has just taken place as determined by the stop counter 654, recording on the following frame may occur in one of two ways. Switch 130 may be actuated with operation taking place by means of a zero signal transmitted by presettable pulse counter 129 or else switch 162 may be actuated to effectively cut out presettable predetermining pulse counter 129 and insert cartoon counter 163 into the system.

Switch 162 is a normally open section of a triple pole double throw switch having another normally open section 162*b* in the output of cartoon counter 163 and a normally closed section 162*a* in the output of the presettable pulse counter 129. Sections 162, 162*a*, 162*b* remain in their other than normal positions for an interval slightly longer than the time required for cartoon counter 163 to uncount and send out a zero signal which performs the same functions as the zero signal of presettable pulse counter 129 as heretofore explained. Cartoon counter 163 is a self recycling or resetting predetermining counter and relay which, once activated by closing switch section 162, will send out a zero signal after counting a predetermined number of pulses such that recording or reproduction will take place on the next frame F. In this way recording may take place on successive frames without resetting dial selector 128. Cartoon counter 163 is self resetting.

Reproduction from a selected frame proceeds by operating switch 160 to clear drum 153 of signals, setting dial selector 128, and then operating switch 170. This will send signals which open normally closed switches 171 and 172 thereby opening the circuits to video recording head 122 and erase head 124 respectively. The apparatus will operate as during the recording process but erase head 124 and video recording head 122 will not be activated. However, pickup head 125 will read information recorded on the selected frame and transmit it to monitoring means 150 where it may be viewed. Switches 171 and 172 will be returned to their normally closed position by the signal output of clipper differentiator 136.

Switches 178—180 are provided for manual operation of the motor controllers to their start, stop, and reverse positions respectively. If a new operation should be desired or the apparatus has been stopped before cartoon counter 163 has uncounted, it may be manually reset by switch 181. Similarly switch 182 serves as a manual reset for bistable switch 135 to return it to its normally open position. The bistable switches hereinbefore referred to may be comprised of vacuum tube switching circuits typical of the computer art. However, the tape drive of the instant invention is reasonably slow so that latching relays will give satisfactory performance.

It should be apparent to those skilled in the art that the magnetic tape and associated head having longitudinal relative movement as hereinbefore described may readily be replaced by a magnetic tape and associated heads wherein a combination longitudinal and transverse relative movement is utilized. In the latter system the information is recorded on a plurality of channels oblique to the longitudinal axis of the tape thereby achieving slower tape speeds. Such a system is utilized in the Ampex Video Tape Recorder described in the August 1956 issue of Electronic Industries published by Chilton Co., Inc.

It is noted that the function methods of FIGS. 2 and 4 utilized for indication tape frame positions by recording spaced apart pulses on a channel of the tape 1 other than that on which the video picture signal is recorded, may be replaced by signal means recorded on said channel on which said video signals are recorded. Marker pulse signals may be provided at the beginning of each video picture signal or the frame vertical sync signal present in the composite video signal may be clipped therefrom and utilized for the purposes described.

FIG. 4' shows schematically details of the video camera scanning deflection circuit and the associated control and switching means for effecting scanning of the image field 135 and producing a composite video frame picture signal in a condition for recording.

FIG. 4' illustrates a deflection circuit for the video camera 134 of FIG. 4 and the associated switching means or camera actuator 133 of FIG. 4. The switching circuit or controller 133 may also be employed in FIG. 2 for the switching means referred to by the numerals 88 and 87'.

The video camera 134 illustrated is shown as a cathode ray device employing electrostatic deflection although any other type may be employed for the purpose.

The pulse passed through delay element 138 is passed over several circuits including the "switch closing" switching input of a first bistable electronic switch or gate 212, a "closing" switching input to a second bi-stable electronic switch 206 and a trigger input to a 60 cycle multi-vibrator 208 which heads the vertical deflection chain of the deflection circuit of the scanning beam of the camera 134. The pulse to the switch 206 closes said switch and completes a circuit between the output of a 15,000 cycle free running multi-vibrator 205 and the signal input to a counter 207. The pulse to 208 triggers and drives said multi-vibrator causing an immediate output therefrom to the conventional illustrated 60 cycle signal generator 214 and the blanking mixer 213 of the deflection circuit. The output of 214 is produced as the frame vertical sync signal and passed through the vertical sync amplifier 217 from which it passes to the camera beam deflection circuits illustrated and is used to bring the scanning beam to the conventional starting position in the scanning or image field defined by 235 after which said beam is controlled in its defined scanning sweep by the other deflection control circuits illustrated. The output of 217 is also passed to the video amplifier 218 to be combined therein with the picture signal resulting from the scanning and the horizontal sync and blanking signals to provide a composite video signal output. The camera and deflection circuits are conventional closed circuit TV circuits and are described in detail in the text "Elements of Television Systems," by George E. Anner, published by Prentice Hall. In this reference, the counter 207 is a 250 to 1 pulse counter producing a pulse output at 60 cycles per second when connected to the 15,000 cycle free running multi-vibrator.

Thus, one sixtieth of a second after the appearance of the selected frame marker-pulse reproduction at the output of 138, 218 produces an output which is passed to 108 to provide the next vertical sync pulse for returning the scanning beam to its starting position in the image field, and, for faster scanning, the second sweep of the image field starts whereby the picture signal output is continued to the video amplifier 218.

The output of 207 is also passed to a counter 210 which produces a pulse output upon receipt of at least two pulses from 207. The output of 138 is passed through the closed gate 212 and is used to open said gate 206 after passing therethrough to the "open" switching input to 206. Thus further signals from the 15,000 cycle multi-vibrator 205 are prevented from passing to the counter so that it will remain in a reset condition for the next recording cycle. The pulse output of 207 is also passed through 212 to the marker pulse recording head 123 to indicate the position of the signal just recorded and for use, as described in recording the next video signal on 100. The output of 210 is passed through a delay line 211 to the "open" switching input of switch 212 thereby breaking the circuit between 210 and recording head 123. The output of 212 is also passed to the "open" switching input of the switch 135 in the output of the video amplifier 218 thereby preventing the passing of any signals therefrom to the picture signal recording head. For cartooning operations or the like, the counter 210 may be adjustable to produce an output signal after any number of predetermined inputs thereto from 207. This is provided in the event it is desired to maintain a still image in a motion picture recording for an extended period of time such as the image of a printed title or a condition of suspended animation. In order to view and evaluate or adjust the scanned field 235 on the image field of the monitor screen 152, a circuit 190 is provided which bypasses the switch 206 and connects the multi-vibrator 205 with the input to 207. A manual switch 192 is provided in the circuit 190 for opening and closing said circuit. It is assumed that the counter 210 is not only self resetting after reaching its predetermined or preset count, but is also provided with automatic resetting means operated a time interval after the input to the counter stops so that regardless of the period of time the circuit 190 is completed, the counter 210 will automatically reset for the next recording operation.

FIG. 6 is a schematic diagram showing a positional controller which, in the control system of FIG. 4, will perform the functions of the control unit referred to by the numeral 129. The controller 129, which is a positional computer capable of indicating by an output signal when a predetermined section or length of the tape is a predetermined distance from or opposite one of the transducing heads, operates by the relative rotation of two aligned shafts 602 and 604. The shaft 602 is stepped from a predetermined or zero angular position through a selected counterclockwise angular motion (in movement comprising a selected number of unit angle increments) said angle being proportional to the length of said tape moved past said heads from its beginning frame to the frame on which said selected frame is located for transducing on or from. The shaft 604 is adapted to rotate, as the tape 100 moves, an angle (from said zero angle) which is proportional in value to the degree of actual motion of the tape 100 past the transducing heads.

Secured to the ends of each shaft are electrically conducting contactor arms 606 and 608 which are shaped such that a contacting element near the end of each will cross and contact each other when both shafts are rotated the same angle from said common zero or starting position. By providing drives 610 and 612 for each shaft which will step the respective shafts intermittently through similar unit increments, and providing said contactors 606 and 608 as switching elements in a circuit 642 containing a power supply PS said circuit will be completed, providing a signal utilizable for control purposes, when the contactors touch (i.e. the shafts are at the same angular positions). The crossing of the contactors 606 and 608 signifies that the tape section at or approaching the transducer heads 121' corresponds to that selected by a predetermined rotation of the shaft 602 from its zero position.

The shaft 602 is stepped (counterclockwise in FIG. 6) by a mechanism 610 including a ratchet wheel 614 keyed to said shaft driven by a pawl 616 actuated by a solenoid 618. The shaft 602 is rotated counterclockwise and returned to zero by an electric motor 634 coupled directly thereto. The drive 612 for shaft 604 includes means for stepping said shaft in either the clockwise or counterclockwise directions. A ratchet wheel 620 stepped by a pawl 622 actuated by a solenoid 624 steps the shaft 604 clockwise. Ratchet wheel 626 driven by pawl 628 operated by solenoid 630, steps shaft 604 counterclockwise. The input to solenoid 618 is from a rotary dial switch 128 which transmits a selected number of pulses thereto depending on the selected position manually dialed thereby, and steps 602 said selected number of angular units from a starting or zero angular position. Resetting shaft 602 to zero is effected by manually closing switch 632 which pulses the starter of the servo motor 634 driving said shaft clockwise. The shaft 602 rotates until pin 636 projecting therefrom strikes a stop 638. The motor 634 is shut off by a pulse to its stop control from a limit switch 638' actuated when 636 engages 638.

As stated, the position of the shaft 604 at any instant is an indication of the frame of the tape 100 which is adjacent the transducing heads at the same instant. In other words, said shaft 604 moves an angular distance from said zero position, proportional to the number of recording frames moved by the tape from the first frame past said heads. Direction of rotation of shaft 604, clockwise or counterclockwise, is controlled by logical switching means adapted to effect its rotation clockwise (in FIG. 6) when 100 is being driven in reverse from reel 102 to 101, and counterclockwise when 100 travels in the forward direction from 101 to 102. Said shaft rotation is interlocked to the direction of motion of the tape 100 by use of a bi-stable switch 640 having one signal input from the reproduction transducer 121 which is gated thru 640 to either the solenoid 624 or 630 and a switching input from a circuit 646 to be described. The method of switching 640 may be described by noting the function of a circuit 642 which includes the contactors 606 and 608. The shafts 602 and 604 are electrical conductors and are insulated from each other. Electrical brush contactors 603 and 605 ride on shafts 602 and 604 and provide the contactors 616 and 618 in a series circuit with a power supply PS and a pulse transformer 644. Thus when the contactors 606 and 608 touch each other, the transformer 644 produces simultaneous output signals over the multiple illustrated circuits extending therefrom. An output of 644 extends to the switching inputs of bistable switches 640 and 650. The latter passes a reproduction of the same input to 644 after it has been delayed in delay relay 660 to one of two circuits 652 or 655 and switch 640 is switched thereby to pass the output of framepulse reproduction head 121 to one of the two solenoids 624 or 630. An output of 644 is also passed to the switching input of bi-stable switch 646 which switches an input circuit 647, which is connected to both of the manual control switches 130 and 170, to one of two output circuits 648 and 648' depending on whether the pulse last received by the switching input to 646 from 644 is an odd or even pulse (i.e. a function of the relative position of the contactors 606 and 608 prior to closing said circuit which in turn is a function of the relative position of the tape and transducing heads).

The circuit 129 is actually a positional computer and controller of the motion of the tape, and the condition of the bistable switches 640, 646 and 650 is an indication of whether the selected frame of tape from or to which transducing is required is on reel 101 or 102. The condition of switch 646 for example, determines whether the tape will be driven forward or in reverse when the controls 130 or 170 are energized. An example will first be given describing the control action occurring to effect tape motion, camera and transducer gating to transduce on and/or from a selected frame when said frame is located on reel 102 ahead of the transducers. For this situation, it will be necessary to automatically drive the tape in reverse a distance such that when stopped by the action of said controllers 129 and 131. Said tape will be in a position for transducing on or from the selected frame by the operation thereafter of the single frame transducing controller 163. When the selected frame is ahead of the heads 121', switch 646 is conditioned such that its signal input 647 (frame manually operated switches 130 and 170) is connected through circuit 648 to the reverse drive inputs R of the tape transport mechanism. Thus, if said selected frame is ahead of said transducing heads somewhere on reel 102, actuation of either switch 170 or 130 will cause the tape transport to drive the tape in reverse so that the selected frame will approach said heads. When the selected frame is on reel 102, switch 640 is in the switching condition (640*a*) whereby the output of 121 will energize 624 and step shaft 604 clockwise to cause 606 to approach 608. Bistable switch 650 is in a condition 650*b* such that when 644 is next energized as the contactors of arms 606 and 608 cross, it (650) will switch to its other condition 650*a* so that an output from 644 will be passed therethrough over a circuit 652. A reproduction of the same pulse which caused an output from 644 and switched 650 to 650*a* as 606 and 608 crossed is passed through 650 after the latter has switched to 650*a* by the provision of delay relay 660 in the output circuit 651 of 644 and is used to energize control apparatus to effect stoppage of the tape with the selected frame a predetermined distance behind the heads 121' (on reel 101) so that energization thereafter of the single frame or cartooning selector switch 162 and the sequential controller 163 will result in transducing from and (or) to said selected frame. Said apparatus for automatically effecting stoppage of the selected frame of said tape a predetermined distance or number of frames beyond or behind said heads comprises a predetermining counter 654 and a normally open switch 653 having a switching input from 650, a signal input from the reproduction transducer 121 and a signal output (from 121) to 654. The counter 654 is a self resetting predetermining counter-relay adapted, upon the receipt of a predetermined number of frame indicating pulses from 121 transmitted thereto after the selected frame has crossed the transducing heads (after 606 and 608 have crossed), to transmit an energizing signal to the tape transport motor stop inputs or stop control S. The count setting of 654 is similar to that in the predetermining counter of the single frame controller 163 and is of a sufficient count magnitude to stop the selected frame a sufficient distance behind the transducing heads to permit said tape to accelerate to the required video recording speed and to attain a constant recording velocity prior to the arrival of said selected frame at said transducing heads when selector 162 is energized. The normally open switch 653 is provided with a built in delayed opening circuit or dashpot mechanism adapted to automatically open said switch a delayed period after closing sufficient to permit the counter 654 to receive its predetermined pulse count from 121 so that subsequent reproduction from the tape will not affect 654. The numeral 662 refers to a normally closed switch which is opened when the panel switch 664 is closed during the operation of dial selector 128 to prevent the energizing of 653 should the contactors of 606 and 608 cross during the setting up of the frame selection computer 121. When switch 664 is closed, it simultaneously opens normally closed switch 162*a* preventing the passage of any signal to 131.

In the situation where the selected frame is a sufficient number of frames behind the transducing heads on reel 101 to permit acceleration of the tape to the required constant video recording speed by the time said selected frame passes said transducing heads, 608 is counterclockwise of 646, 640 has been conditioned from the prior pulse from 644 to switch to condition 640*b* so that the output of 121 is passed to 630 and used to step 606 counterclockwise towards 608, 650 is in condition 650*b* so that the output of 644 will be passed to 131 and 132 over circuit 655. The switch 646 is in a condition whereby the starting pulse from circuit 647 will be passed over circuit 648′ to the forward drive control F of the tape transport. When contactors 606 and 608 cross, as the beginning of the selected frame approaches the transducing heads and the marker pulse for the selected frame is near the reproduction head 121, the pulse transformer 644 becomes energized and transmits pulses to said various switches including said selection transducing pulse thru switch 650 to 131 and 132 to effect the described action or actions depending on whether one or both the switches 130 and 170 were initially energized.

FIG. 7 is a schematic diagram showing details of video recording and reproducing apparatus similar to that illustrated in FIG. 4 and applicable with minor modifications to the control means thereof, which utilizes transducing apparatus comprising means for moving both a magnetic tape and the transducing heads, the latter movement across said tape when transducing thereon or therefrom. Reference is made to the Ampex Video Tape recorder, described in the August 1956 issue of Electronic Industries for details of such type of magnetic recording apparatus which comprises in part a rotatable drum 403, on which arrays of magnetic transducers are provided which rotate therewith and terminate at or near the surface of said drum 403 over which the tape 400 is driven in a path essentially parallel to the axis of rotation of said drum so that said transducers sweep paths which are parallel to each other and oblique to the edges of said tape.

Operation is accomplished by utilizing a relatively wide tape for 400 and providing means for holding said tape against the surface of the drum so that the width of said tape covers 90 to 120 degrees of rotation of the drum. By mounting three or four common recording and/or reproducing transducer heads at 90 or 120 degrees apart on the drum in the same plane normal to the axis of rotation, so that each sweeps the same circular path, and connecting all heads to a common input or output circuit by means of commutators and brushes operatively connected to said drum, the end of a signal recorded by one head on an oblique band area of the tape 400 will be continued at or near the beginning of the next parallel recording area swept by the next head, in said group, to sweep across said moving tape. With this type of apparatus, the tape may be driven at a much slower speed than that of FIG. 4 as the rotation of the transducers mounted on the drum contributes to the relative recording speed.

In FIG. 7 five transducing head groups are shown for the purposes of illustrating the transducing functions and include a group 421 for reproducing the so called frame marker pulse; 422 for recording said frame marker pulses; 424 for recording said video signal; 425 for reproducing said video signal and 423 for erasing any signal thereopposite when energized or powered. Of course, said five groups may be replaced by one or two groups of heads if said heads are each adapted to perform the multiple functions of record, reproduce and erase signals depending on which of said transducing means is energized.

A single group of heads adapted to perform all three transducing functions will suffice if a limit switch 430 (actuated by a protrusion or cam section of the shaft 404 on the drum 403 each time said drum rotates) is utilized to indicate frame position. The limit switch 430 is adapted to transmit a pulse each time a specific multiple head in the rotary group approaches during its rotation, the border of the tape 400. The pulse is transmitted to either or both the controllers 129 and 163 in accordance with FIG. 4 whereby said switch 430 replaces said marker pulse reproduction head 121 and eliminates the necessity of recording frame marker pulses through 123. When utilizing 430, each separately recorded video signal will be recorded at or near the beginning of an oblique recording area (near the edge of the tape or a predetermined distance from said edge) and each will extend along the same number of said oblique areas. Thus frame selection will be a matter of presetting the positional computer 129 to transmit a control pulse over its output upon the receipt at its input of the number of pulses from 430 indicative of the specific longitudinal motion of the tape 400 to reach the selected frame.

The rest of the control circuitry would be similar to that illustrated in FIG. 4. The motor and controls 409, 410 and 413, correspond to motor driving means similar to respective drives 209, 210 and 213 of FIG. 4, which are modified to effect the necessary constant speed operation. A constant speed motor 432 is provided, and is controlled to start and stop by the controls F and S illustrated in FIG. 4, to drive the shaft 404 of drum 403 thru gears 434 one of which is secured to the shaft 433 or 432. The tape 400 is started and stopped, reversed and automatically controlled as in FIG. 4.

Numerous other modifications of the present invention will be appreciated by those skilled in the art and accordingly the appended claims should be construed broadly as is consistent with the appended claims and in certain instances some features of the invention will be used without a corresponding use of other features.

I claim:

1. A system for the single frame recording of video signals on a magnetic tape and the single frame playback of said recording and its use to modulate the write beam of a cathode ray tube said tape being divided into a plurality of lengths positioned in tandem relationship parallel to the longitudinal axis of said tape, said system comprising a video camera, a monitor means, a location sensing means a marker playback transducer, a video recording transducer, a video playback transducer, said tape being movable along its longitudinal axis and having at least one marker channel and at least one video picture signal channel parallel to said marker channel and (extending parallel to said longitudinal axis), each of said plurality of lengths having a marker signal recorded thereon, said marker playback transducer being operatively positioned to reproduce said marker signals, said video recording transducer being operatively positioned to record video signals on said video channel, said video playback transducer being operatively positioned to reproduce video signals recorded on said video channel, said video camera being operatively connectable to said video recording transducer to feed video signals thereto, said video playback transducer being operatively connectable to said monitor means to feed video signals thereto, said marker playback transducer being operatively connected to said location sensing means to feed marker signals thereto, said location sensing means being operatively connected to said video transducers whereby said video recording transducer is operatively connected to said video camera and said video playback transducer is operatively connected to said monitor means when a preselected length of said tape is opposite the respective video transducers.

2. The system as set forth in claim 1 in which the tape is in motion while the marker playback transducer is transmitting marker signals to the location sensing means and said tape is stationary and the video transducers are in motion while they are operatively connected to the video camera and the monitor means.

3. The system as set forth in claim 1 in which the location sensing means comprises a code matching device and a selecting means operatively connected thereto and operable to preset said code matching device with a code corresponding to the marker signal recorded on the selected length whereby said video transducers will be energized when in operative position with respect to said selected length.

4. The system as set forth in claim 1 in which the monitor means provides a continuous visual display of the selected single frame beginning substantially from the moment said selected frame is recorded on said tape.

5. The system as set forth in claim 4 in which the monitor means includes a video storage tube.

6. The system as set forth in claim 4 in which the monitor means includes a rotatable magnetic member upon which the video signals, fed from the video playback transducer, are recorded.

7. A system for the single frame recording of video signals on a magnetic tape and the single frame playback of said recording, said tape being divided into a plurality of lengths positioned in tandem relationship parallel to the longitudinal axis of said tape, said system comprising a video camera, a monitor means, a location sensing means a marker playback transducer, a video recording transducer, a video playback transducer, said tape being movable along its longitudinal axis and having at least one marker channel and at least one video channel parallel to said marker channel and extending parallel to said longitudinal axis, each of said plurality of lengths having a marker signal recorded thereon, said marker playback transducer being operatively positioned to read said marker signals, said video recording transducer being operatively positioned to record video signals on said video channel, said video playback transducer being operatively positioned to read video signals recorded on said video channel, said video camera being operatively connectable to said video recording transducer to feed video signals thereto, said video playback transducer being operatively connectable to said monitor means to feed video signals thereto, said marker playback transducer being operatively connected to said location sensing means to feed marker signals thereto, said location sensing means being operatively connected to said video transducers whereby said video recording head and said video camera and said video pickup head and said monitor means are operatively connected when a preselected length of said tape is opposite the respectively connected to guide and move said tape transport operatively connected to guide and move said tape in a first direction and in a second direction opposite to said first direction, said video transducers being energized only when said tape is moving in said first direction, a multi-circuit cycle timer operatively active, when said tape is in motion, connected to said tape transport, said tape when moving in said first direction being automatically stopped and thereafter reversed by signals transmitted from said multicircuit cycle timer after said selected length has passed said video transducers, to a location at a predetermined tape length prior to the tape length just transduced whereby said video transducers are a sufficient distance in advance of the tape length succeeding the prior transduced tape length to permit said tape to accelerate to video recording speed for transducing on the tape length following said prior transduced tape length.

8. The system as set forth in claim 7 wherein the location sensing means also includes a stop counter operatively connected to the tape transport, said tape when moving in the second direction being stopped a predetermined number of lengths in advance of the selected length by signals transmitted from said stop counter.

9. The system as set forth in claim 7 wherein the location sensing means also includes a cartoon counter operatively connected to actuate the video transducers when the tape length immediately following the last selected length is opposite the video transducers.

10. A system for the single frame recording of video signals on a magnetic tape and the single frame playback of said recording and its use to modulate the write beam of a cathode ray tube said tape being divided into a plurality of lengths positioned in tandem relationship parallel to the longitudinal axis of said tape, said system comprising a video camera, a plurality of monitor means, a location sensing means a marker playback transducer, a plurality of video recording transducers, a plurality of video playback transducers, said tape being movable along its longitudinal axis and having at least one marker channel and at least one video picture signal channel parallel to said marker channel and (extending parallel to said longitudinal axis), each of said plurality of lengths having a marker signal recorded thereon, said marker playback transducer being operatively positioned to record video signals on said video channel said video camera being operatively connectable to said plurality of video recording transducers to feed video signals thereto, said plurality of video playback transducers being operatively connected to said location sensing means to feed marker signals thereto, said location sensing means being operatively connected to said plurality of video transducers whereby said plurality of video recording heads is operatively connected to said video camera and said video pickup head is operatively connected to said monitor means when a preselected length of said tape is opposite the respective video transducers, said tape being in motion along its longitudinal axis and said pluralities of video transducers being in motion obliquely with respect to said longitudinal axis while said pluralities of video transducers are operatively connected to said video camera and said monitor means.

11. A system for the single frame recording of video signals on magnetic tape and the reproduction (playback) therefrom of selected one of said single frame recordings, said single frame recordings being each provided on a predetermined area of a plurality of said areas on said tape positioned in tandem relationship to each other, said system comprising, in combination a video camera, a monitor means, a location sensing means, a video recording transducer, a video playback transducer, a transport means, said tape being movable along its longitudinal axis by said transport means and having at least one channel for the recording of said video picture signals thereon, means recording video signal indicating means individual to each of said areas in predetermined positions on said tape relative said video recording areas for indicating the positions of respective of said video signals, means reproducing said video signals and said video signal indicating means, means operatively connecting said video reproducing means to said monitor means, means operatively connecting said video signal position indicating means with said location sensing means to transmit said location indicating signals thereto, said location sensing means being operatively connected to said video signal reproducing means whereby said video camera and video monitor means are operatively connected when a preselected length of said tape is opposite said video reproducing means.

12. Apparatus in accordance with claim 15, said second counter-relay being adjustable to permit the recording of a video signal produced by scanning said video picture field any predetermined number of times.

13. A system for the single frame recording of video signals on magnetic tape and the reproduction therefrom of selected of said single frame recordings, said single frame recordings being each recorded on predetermined areas of said tape each parallel to each other and oblique to the longitudinal axis of said tape, said system comprising in combination a video scanner, video recording, erase and reproduction transducing means each including a plurality of heads, said heads being rotationally mounted and adapted to rotate about a fixed axis in a path across the surface of said tape as said tape moves in a fixed lineal path whereby said transducing heads sweep a plurality of parallel areas obliquely on said tape, motor means driving said heads in said rotary path, a tape location sensing means including a presettable predetermining counter, means actuating said counter with each predetermined degree of revolution of said transducing head rotating means, said counter being operatively connected to a video signal reproducing means including a trigger input thereto whereby, upon receipt of a countout pulse from said counter a video picture signal output is transmitted from said reproducing means therefrom, to said recording transducer, said location sensing means countout pulse also acting to operatively connect a video monitor with means reproducing said video signal recorded on said tape.

14. A video recording and reproduction system in accordance with claim 11, said single frame recordings being each recorded on multiple predetermined areas of said tape which are parallel to each other and oblique to the longitudinal axis of said tape, said transducers comprising a plurality of rotatably mounted heads adapted to rotate while said tape travels a fixed lineal path and to sweep said oblique paths across said tape, there being multiple heads sweeping a fixed circular path for each transducing function in a manner such that the end of one part of a video frame recording which occurs near the edge of said tape continues further down the tape near the other edge on a parallel channel, said location sensing means being either interlocked to the rotation of said heads or responsive to signals recorded on said tape.

15. Means for recording a single frame video derived from a video scanning camera on a selected one of a plurality of sections of a magnetizable recording member, said means comprising a video recording transducer, means for triggering a video read beam of said camera when a selected section of said recording member is opposite said recording transducer; said triggering means comprising means for reproducing a video frame indicating pulse stored by said member; said frame indicating signal after being reproduced by said last recited means being effective to produce a trigger pulse when the selected frame first appears at said video recording transducer; a first delay means providing said trigger pulse at a predetermined time after the reproduction of said frame indicating signal at a video trigger input to said video scanning camera, said trigger input including a first switching signal input; a first pulse generator, operable at a line scanning frequency, and a first automatic resetting counter-relay, adapted to produce a signal output upon receipt of a number of pulses from said first pulse generator equal to the number of lines in a single frame; a first gate which is closed by the receipt of said first signal input thereby completing a circuit between said first pulse generator and said first counter-relay; said camera including a vertical deflection chain means and a second pulse generator heading said chain means; said first signal input to said trigger circuit also including an input signal to said second pulse generator which, upon receipt of this said input signal, triggers said chain means thereby causing a scanning beam of said camera to initiate scanning from a predetermined point in a scanning field; said video camera also including a multi-stage video amplifier; each of said stages having an input circuit and an output circuit; a second circuit, including a second gate, between the final video amplifier stage and said recording transducer; said first input being effective to close said gate thereby completing said second circuit; a second automatic resetting counter-relay operatively connected to said first counter-relay; said first counter-relay signal output being fed to both said second pulse generator and said second counter-relay; said second counter-relay being constructed to transmit a pulse therefrom after the receipt of at least two pulses from said first counter relay over several circuits including a switch opening input to said first and said second gates thereby preventing the passage of video signals from said camera to said recording transducer beyond the end of the signal produced from the last video scanning sweep of a single frame.

16. A system for the single frame recording of video signals and the single frame playback thereof, said system comprising an erasable video recording member, a video pickup means, a video recording transducer, a location sensing means, a marker playback transducer, a video playback transducer, and a visual presentation means; said video recording member being divided into a plurality of single frame recording locations each identified by a marker signal recorded on said video recording member; said marker playback transducer being operatively positioned to reproduce said marker signals; said video pickup means being operatively coupled to said video recording transducer to feed video signals thereto, said video recording transducer being positioned to record video signals originated by said video pickup means upon said video recording member; said video playback transducer being operatively positioned to pick up video signals recorded on said video recording member; said video playback transducer being operatively connectible to said visual presentation means to feed video signals thereto; said marker playback transducer bing operatively connected to said location sensing means to feed marker signals thereto; said location sensing means being constructed and operatively connected to said video transducers whereby said video recording transducer is operatively connected to said video pickup means and said video playback transducer is operatively connected to said visual presentation means when a preselected recording location is opposite the respective video transducers.

17. The system as set forth in claim 16 in which the recording member comprises a thin elongated tape; said system also comprising a transport system to which said tape is mounted for guided movement along its longitudinal axis; said video recording locations being arranged in tandem.

18. The system as set forth in claim 17 in which the tape is stationary while video signals are being transduced to and from said tape.

19. The system as set forth in claim 17 in which the tape includes at least one marker channel whereon the marker signals are recorded and at least one video channel whereon the video signals are recorded; said marker and video channels extending parallel to the longitudinal axis of the tape.

20. The system as set forth in claim 16 in which the location sensing means comprises a code matching device.

21. The system as set forth in claim 17 in which the tape is movable in a first direction and in a second direction opposite to said first direction; said tape moving in said first direction while video signals are being fed to and from said tape; said location sensing means including a stop counter; said stop counter being effective, when said tape is moving in said second direction, to stop said tape a predetermined distance in advance of a selected one of said recording locations; said predetermined distance being sufficient to permit acceleration of said recording tape to a constant predetermined video recording speed in said first direction when said visual indication means is operatively connected to said video pickup head by said location sensing means.

22. The system as set forth in claim 16 in which the location sensing means is further constructed to selectively pass video signals from said video pickup means to said visual presentation means by bypassing said video recording member whereby video signals may be monitored prior to recording thereof.

23. A system for the single frame recording of video signals and the single frame playback thereof, said system comprising an erasable video recording member, a video pickup means, a video recording transducer, a location sensing means, a visual presentation means, and first means for producing a viewable image at said visual presentation means; said video recording member being divided into a plurality of single frame recording locations each identified by a marker signal recorded on said video recording member; said marker playback transducer being operatively positioned to reproduce said marker signals; said video pickup means being operatively coupled to said video recording transducer to feed video signals thereto, said video recording transducer being positioned to record video signals originated by said video pickup means upon said video recording member; said first means constructed and operatively positioned with respect to said video recording member to act responsive to signals recorded on said member and produce a viewable image at said visual presentation; said marker playback transducers being operatively connected to said location sensing means to feed marker signals thereto; said location sensing means being constructed and operatively connected to said video transducers and said first means whereby said video recording transducers is operatively connected to said video pickup means and said first means is activated to produce a viewable image at said visual presentation means when a preselected recording location is opposite the respective video transducers.

References Cited in the file of this patent

UNITED STATES PATENTS

| | | |
|---|---|---|
| 2,335,864 | Lang | Dec. 7, 1943 |
| 2,380,392 | Begun | July 31, 1945 |
| 2,517,808 | Sziklai | Aug. 8, 1950 |
| 2,698,875 | Greenwood | Jan. 4, 1955 |
| 2,813,927 | Johnson | Nov. 19, 1957 |
| 2,860,179 | Blackstone | Nov. 11, 1958 |
| 2,874,214 | Anderson | Feb. 17, 1959 |